United States Patent
Nathan et al.

(10) Patent No.: US 7,556,315 B2
(45) Date of Patent: Jul. 7, 2009

(54) LATCH ACTUATOR SYSTEM

(75) Inventors: John F. Nathan, White Lake, MI (US); H. Winston Maue, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 413 days.

(21) Appl. No.: 11/278,295

(22) Filed: Mar. 31, 2006

(65) Prior Publication Data
US 2007/0236067 A1 Oct. 11, 2007

(51) Int. Cl.
*B60N 2/48* (2006.01)

(52) U.S. Cl. .............................. 297/378.12; 297/378.1; 297/378.14

(58) Field of Classification Search ............ 297/378.12, 297/378.1, 378.14
See application file for complete search history.

(56) References Cited

U.S. PATENT DOCUMENTS

| | | | | |
|---|---|---|---|---|
| 5,192,147 | A * | 3/1993 | McCloskey | 403/322.3 |
| 5,558,403 | A * | 9/1996 | Hammoud et al. | 297/378.12 |
| 5,732,923 | A | 3/1998 | Tame | |
| 5,733,008 | A | 3/1998 | Tame | |
| 5,771,742 | A * | 6/1998 | Bokaie et al. | 74/2 |
| 6,086,097 | A | 7/2000 | Van Wynsberghe | |
| 6,352,310 | B1 * | 3/2002 | Schmidt et al. | 297/378.12 |
| 6,390,558 | B2 * | 5/2002 | Fischer et al. | 297/410 |
| 6,910,714 | B2 | 6/2005 | Browne et al. | |
| 7,172,253 | B2 * | 2/2007 | Haverkamp | 297/378.1 |
| 2002/0125757 | A1 * | 9/2002 | LeTournoux | 297/378.12 |
| 2002/0135196 | A1 | 9/2002 | Bingle et al. | |
| 2002/0145315 | A1 | 10/2002 | Fraley et al. | |
| 2003/0038517 | A1 | 2/2003 | Moran et al. | |
| 2003/0080601 | A1 * | 5/2003 | Charras et al. | 297/378.12 |
| 2003/0197410 | A1 * | 10/2003 | Blair et al. | 297/378.12 |
| 2005/0023086 | A1 * | 2/2005 | Szilagyi | 188/67 |
| 2005/0218710 | A1 | 10/2005 | Browne et al. | |

FOREIGN PATENT DOCUMENTS

| | | |
|---|---|---|
| EP | 1 410 945 A1 | 4/2004 |
| EP | 1 645 460 A1 | 4/2004 |
| EP | 1 787 857 A2 | 5/2007 |
| EP | 1 516 773 A1 | 8/2007 |
| WO | 2005112247 A2 | 11/2005 |

OTHER PUBLICATIONS

Combined Search and Examination Report for UK0705461.2.
Lewis Research Center, Cleveland, Ohio, Latch-Release Pin Puller With Shape-Memory-Alloy Actuator, PennEngineering, Fastening Technologies, http://www.nasatech.com/Briefs/Feb98/LEW16511.html.
http://www.tiniaerospace.com/images/pinpullerconcept.gif.

* cited by examiner

*Primary Examiner*—Laurie K Cranmer
(74) *Attorney, Agent, or Firm*—Brooks Kushman P.C.

(57) ABSTRACT

An actuator for a latch assembly for securing a latched member that is linked to a trigger. The trigger may be a shape memory alloy actuating element that is actuated in response to receiving an electrical signal. The trigger may be mechanically reset to a locked state by the latched member. A method of operating the latch is also disclosed wherein the trigger is actuated in response to an electrical signal resulting in a force being applied in a first direction to a cable that connects the trigger to release the latch. The trigger is reset by exerting mechanical force on the trigger in the opposite direction. The latch system may be applied to a vehicle seat having a seat back that pivots relative to a seat base to allow the seat back to pivot over the seat base.

14 Claims, 5 Drawing Sheets

LATCH ACTUATOR SYSTEM

BACKGROUND OF THE INVENTION

1. Field of the Invention

The present invention relates to a remote actuator for a latch that releases a latched member for movement that may be automatically reset by moving the latched member.

2. Background Art

Actuators are devices that cause an apparatus to operate. Latches are devices that are used to grasp or lock an object, as with a catch and a lever, or the like. An actuator may be used to release or engage a latch. Some actuators may be remotely connected to a latch to allow for operation of the latch from a distance.

Latches are used in a wide variety of applications. For example, latches may be provided as a part of a machine, on building doors or windows, or in vehicles. Latches that can be reset have the advantage that they can be used repeatedly. One way to provide a latch that can be reset is to provide an actuator that operates a motor and gear reducer to release the latch by forward rotation of the motor and reset the latch by reverse rotation of the motor. While this approach is effective, the cost of a motor and gear reducer may be uneconomical in many applications.

In some applications, it may be desirable to provide a manual actuator and a power actuator for a latch that may be alternatively used to operate the latch. Dual mode actuators may be provided to allow a latch to be manually operated or power operated. One problem with such dual actuation latches is that one mode of actuation may interfere with the other mode. In addition, resetting the dual mode actuator may be complicated if both modes of actuation are not accommodated by the reset mechanism.

One exemplary application for a dual mode remotely actuated latch is a vehicle seat back folding apparatus. Vehicle seat backs may be folded over the seat base to facilitate ingress and egress. Prior art actuators have been developed that use a motor that drives a gear reducer in one direction to release a latch and driven in the opposite direction to reset the actuator for reuse after the latch is engaged. Seat folding latches may also be specified to be manually actuated in the event that a user wishes to operate the latch manually or if power is not available for the power actuation system. While these types of systems have been developed, the cost of the motor and gear reducer may make such systems uneconomical.

The present invention is directed to solving the above problems by providing a simple, durable and cost effective dual mode actuation system that is resettable for repeated cycles.

SUMMARY OF THE INVENTION

According to one aspect of the present invention, an actuator and a latch assembly is provided that includes a latch that is connected by a link to a trigger. A latched member is secured by the latch that has a release position and a locked position. In the locked position, the latched member is retained by the latch. A link is secured to the latch with the latch being moved by the link in a first direction from the locked position to the release position. A trigger may be secured to the link in a remote location relative to the latch. The trigger has a locked state and a released state. The trigger is in the locked state when the latch is in the locked position. The trigger is actuated in response to an electrical signal to release the latch as the trigger is switched to the release state. The trigger is mechanically reset to the locked state.

According to other aspects of the invention as they relate to the actuator for a latch assembly, the trigger may have a shape memory alloy actuating element that is selectively actuated by the electrical signal that causes heating through a phase change transition temperature. The latch member, for example, may be a seat back. The latch may be pivoted about a pivot point and the latch may have a manually engaged handle on a first side of the pivot point that is connected to the link on a second side of the pivot point.

According to other aspects of the present invention as they relate to the actuator for a latch assembly, the link may be further secured to a power spring that acts upon the latched member and the latch may be secured to the link between the trigger and the power spring. The trigger may be reset by moving the latched member against the biasing force of the power spring to exert a force in the second direction on the link until the trigger is moved to the locked state. Alternatively, the trigger may be reset by moving the latched member to exert a force in the second direction on the link until the trigger returns to the locked state. The link may be moved past the point at which the trigger is reset to the locked state wherein tension applied to the link may be reduced after the trigger is reset and the latched member moves to the locked position.

According to other aspects of the present invention, the trigger may have a housing that encloses a shiftable element that is attached to the link. The shiftable element retracts the link in the first direction when the trigger is switched from the locked state to the released state. A manually engaged handle may be provided on the latch such that the link is not under tension when the latch is in the locked position to permit the latch to be manually moved to the released position. The link may be a cable and the actuator may further comprise a rotary cam guide about which the cable is entrained. The rotary cam guide may control the tension applied by the cable to the latch. A reset tension may be required to reset the trigger and the tension in the cable may be reduced to a level below the reset tension when the latch is in the locked position. The trigger may have a linearly movable armature that is held in the locked position by a locking member such that the locking member restrains an armature spring that applies a retraction force to the link in the first direction when the trigger is released.

According to another aspect of the present invention, a method of operating a latch is provided that secures a latched member in a locked position with the latch member being selectively movable to a released position. The method comprises actuating a trigger that is released in response to an electrical signal so that releasing the trigger results in a force being applied in a first direction to a cable that connects the trigger to the latch to release the latch. Releasing the latch allows the latched member to move to the released position. The trigger is reset by exerting a mechanical force on the trigger in a second direction that is opposite to the first direction.

According to other aspects of the method of the present invention, the step of resetting the trigger may be performed by moving the latched member to the locked position. The step of resetting the trigger may be performed after the latch is released as the latched member moves to the released position. The latch may have an alternate manual actuation mode and the method may further comprise alternatively actuating the latch by manually moving the latch which results in the force being applied in the first direction to release the latch allowing the latched member to move to the release position. During a resetting step, a slack portion is created in the cable to facilitate manual actuation.

According to another aspect of the present invention, a vehicle seat that has a seat base and a seat back that pivots relative to the seat base to facilitate ingress and egress to the vehicle. The vehicle seat comprises a hinge connecting the seat back to the seat base. A latch retains the seat back in a selected position with the latch having a latched condition in which the seat back is held in the generally vertical, but rearwardly inclined, orientation relative to the seat base. The latch may be released so that the seat back is pivoted to a position overlying the seat base. A trigger may be used to cause the latch to be switched between the latched condition and the released condition. The trigger is connected to the latch by a link that is connected between the latch and the trigger. A power spring is connected between the seat back and the seat base that biases the seat back to move toward the position in which it overlies the seat base. The latch in the latched condition functions to resist the biasing force of the power spring. When the latch is released, the seat back is moved by the power spring to the position in which it overlies the seat base. A cable guide cam is secured to the power spring for tensioning and guiding the cable as the seat back is moved between the latched condition and the released condition. The trigger selectively acts on the link in the latched condition to move the link in a first direction to release the latch which in turn releases the seat back to be moved by the power spring to the position overlying the seat base. Movement of the seat back relative to the seat base causes the link to exert a force on the link in a second direction to reset the trigger.

According to other aspects of the invention as it relates to a vehicle seat, the latch may be provided with a handle that may be manually operated to switch the latch from the latched condition to the released condition. The trigger may be a shape memory alloy trigger that remains in a ready state until an electrical signal causes the trigger to be actuated wherein the link is moved by the trigger in the first direction. The cable may be a Bowden type cable that has a wire movably disposed within a sheath. The sheath may be anchored to the seat base with the wire being moved in the first direction to cause the latch to be switched between the latched condition and the released condition.

These and other aspects of the present invention will be better understood in view of the attached drawings and following detailed description of the invention.

DETAILED DESCRIPTION OF THE PREFERRED EMBODIMENT(S)

Figure 1:
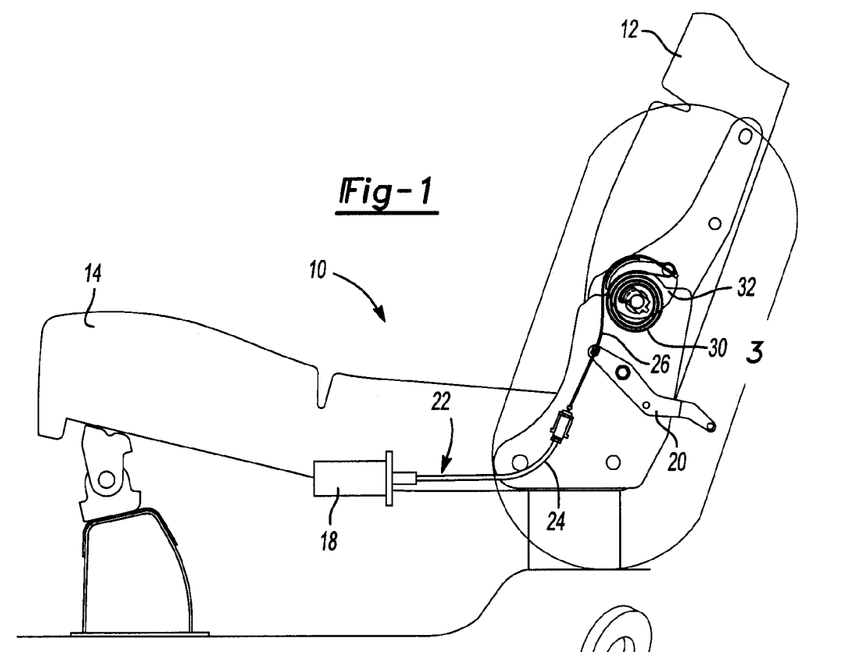
FIG. 1 is a fragmentary side elevation view of a vehicle seat having a latch assembly made in accordance with one embodiment of the present invention.

Referring to FIG. 1, a vehicle seat 10 is illustrated that has a seat back 12 and a seat base 14. An actuator 18, or trigger, is illustrated as being attached to the seat base 14. However, it should be understood that the actuator 18 could be secured to another location on the vehicle or seat support structure. A latch lever 20 is connected to the actuator 18 by a Bowden cable 22, or link. The Bowden cable 22 includes a sleeve 24 that encloses a wire 26 so that the wire 26 is axially moveable relative to the sleeve. The Bowden cable 22 is also connected to a power spring 30. The cable 22, or link, passes over a cable guide cam 32 that is rotatable with the power spring 30.

Figure 2:
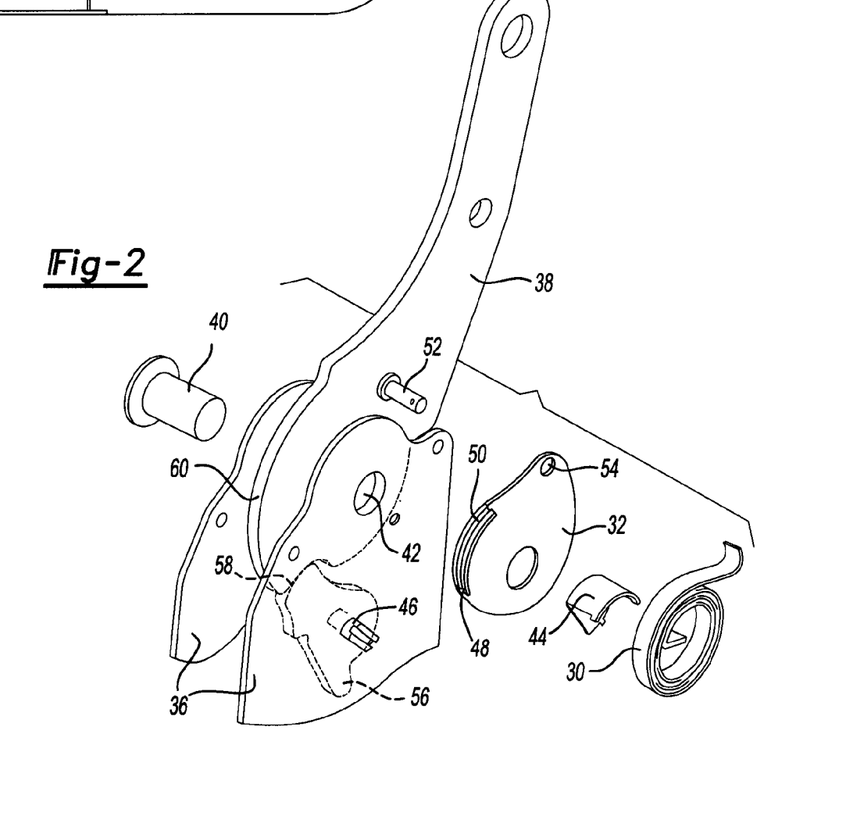
FIG. 2 is an exploded perspective view of a seat back pivot latch having a power spring and cable guide cam made in accordance with one embodiment of the present invention.

Referring to FIG. 2, one type of hinge mechanism is shown in greater detail in an exploded perspective view that shows one way of connecting the seat back to the seat base 14. It should be understood that other types of hinge mechanisms may be adapted to include the latch actuator system of the present invention. A pair of seat base plates 36 are connected to a seat back support bracket 38 by means of a pivot pin 40. Pivot pin 40 is received in a hole 42 that extends through the seat base plates 36, seat back support bracket 38 and cable guide cam 32. A spring bracket 44 retains power spring 30 and interconnects the power spring 30 to the pivot pin 40. The latch lever 20 shown in FIG. 1 is connected to a lever pivot pin 46.

The cable guide cam 32 includes a cam flange 48 that includes a groove 50. The wire 26 is routed around the cam flange 48 and received in the groove 50. A pin 52 is secured to the seat back support bracket 38 and connects the bracket 38 to the cable guide cam 32. Pin 52 is received in a pin hole 54 formed in the cable guide cam 32.

Figure 3:
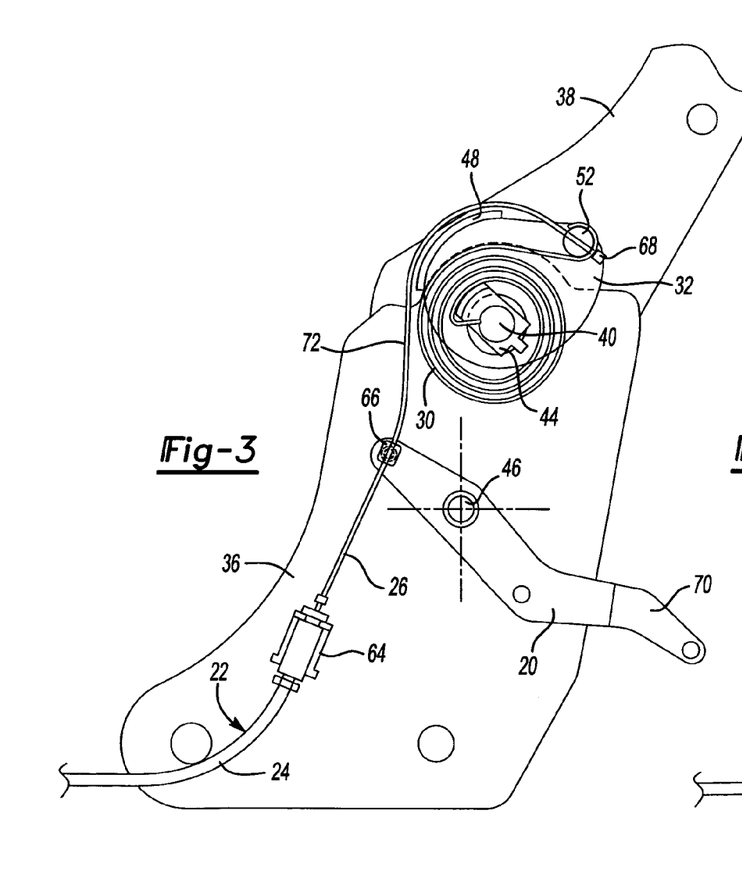
FIG. 3 is an enlarged view of a portion of FIG. 1 showing the actuator in a locked state and the latch in a locked position.

The latch lever 20 is secured to the lever pivot pin 46 which is in turn secured to a latching follower 56. The seat back support bracket 38 includes a step 58 that is engaged by the latching follower 56 when the seat is in its latched position. After the seat is unlatched, the latching follower 56 follows an arcuate cam surface 60 on the support bracket 38 as the support bracket 38 pivots about pivot pin 40 into a position where a seat back 12 is folded over the seat base 14. Referring now to FIGS. 3-7, the latch actuator system is described with reference to the embodiment of the invention described above with reference to FIGS. 1 and 2. FIG. 3 is an enlarged illustration of a portion of the apparatus described with reference to FIG. 1 that is within the oval denoted FIG. 3 in FIG. 1. In FIG. 3, the apparatus is shown in its latched condition with the seat back support bracket 38 held in a vertical, rearwardly inclined orientation and is fixed relative to the seat base plates 36. In this position the latch lever 20 is in its ready position. A cable sleeve bracket 64 secures the sleeve 24 to seat base 14 or other supporting structure. A lever/cable anchor 66 secures one end of the lever 20 to the wire 26. A cable/spring anchor 68 secures the wire 26 to the power spring 30. The wire 26 is routed over the cam flange 48 and is preferably received in a groove 50 formed in the cam flange 48. A handle 70 is provided at the opposite end of the latch lever 20 from the lever/cable anchor 66. The handle 70 is intended to be grasped directly or indirectly by a person for manually manipulating the latch lever 20. The latch is lifted to cause the latching follower 56 to clear the step 58 and allow the seat back 12 to rotate as the latching follower 56 follows the arcuate cam surface 60. While not shown, the handle 70 may be provided with an enlarged handle cover to make the handle 70 easier to grasp and to provide a finished appearance. As shown in FIG. 3, a slack portion 72 may be provided in the wire 26 of the cable 22 to allow the handle 70 to be easily lifted without encountering resistance from the power spring 30 to which the wire 26 is connected. The extent of slack is somewhat exaggerated as shown for illustrative purposes.

Figure 4:
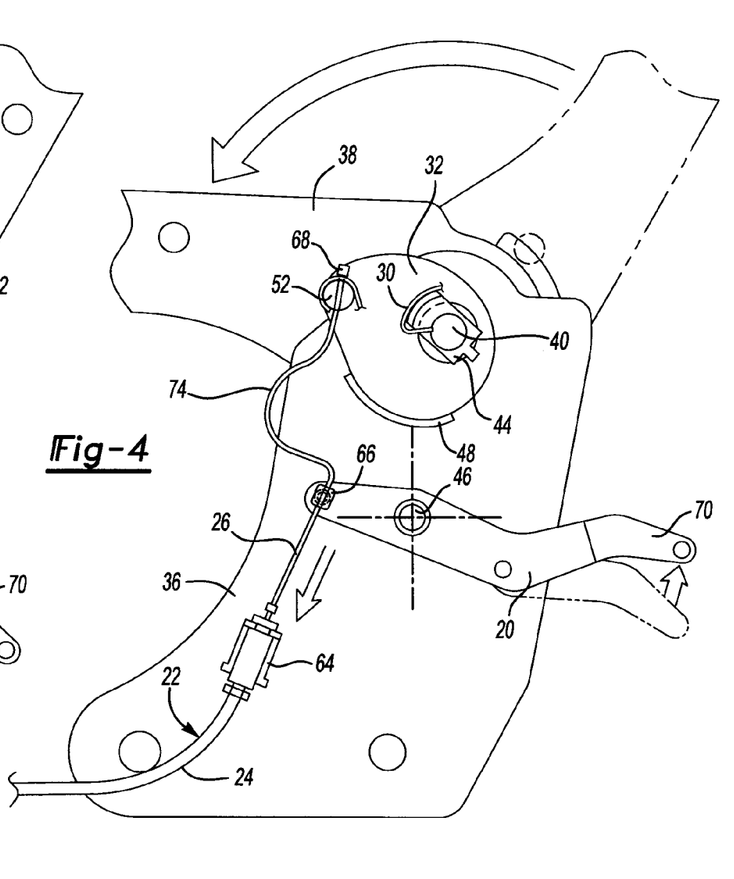
FIG. 4 is a fragmentary side elevation view showing the cable after the actuator has been released causing the latch to be moved to its released position with the seat back, power spring, and cable guide cam rotated upon release of the latch.

Referring to FIG. 4, actuation of the latch is illustrated in either a manual or power mode. In the manual mode the lever 20 may be manually grasped and moved from the position shown in phantom lines to the position shown in solid lines. When the latch lever 20 is lifted, the latching follower 56 disengages the step 58 as previously described. Alternatively, the latch may be power actuated upon triggering the actuator 18. The actuator 18 may comprise a shape memory alloy trigger like the pin puller trigger disclosed in U.S. Pat. No. 5,771,742 the disclosure of which including FIGS. 2 and 3 and the description from column 5 line 34 through column 7 line 47 is hereby incorporated by reference. Alternatively, the actuator could be a solenoid or other linear actuator that is capable of exerting a liner force on cable 22. In the embodiment illustrated in FIG. 4 the actuator 18 exerts a pulling force on the cable that pulls the lever to which it is connected by the lever/cable anchor 66 in a downward direction as indicated by the arrow adjacent to the wire 26 in FIG. 4. When the lever actuator 20 is rotated about the pivot pin 46 the latching follower 56 disengages the step 58 as previously described. When the latching follower 56 clears the step 58 the seat back support bracket 38 moves from the position shown in phantom lines in FIG. 4 along the curved arrow path to the position shown in solid lines in FIG. 4. The power spring drives the seat back 12 and its associated support bracket 38 into the folded over position. The cable guide cam 32 rotates with the support bracket 38 and the wire 26 is driven towards the lever/cable anchor 66 resulting in the formation of a bend 74 in the wire 26.

Figures 5, 6, 7:
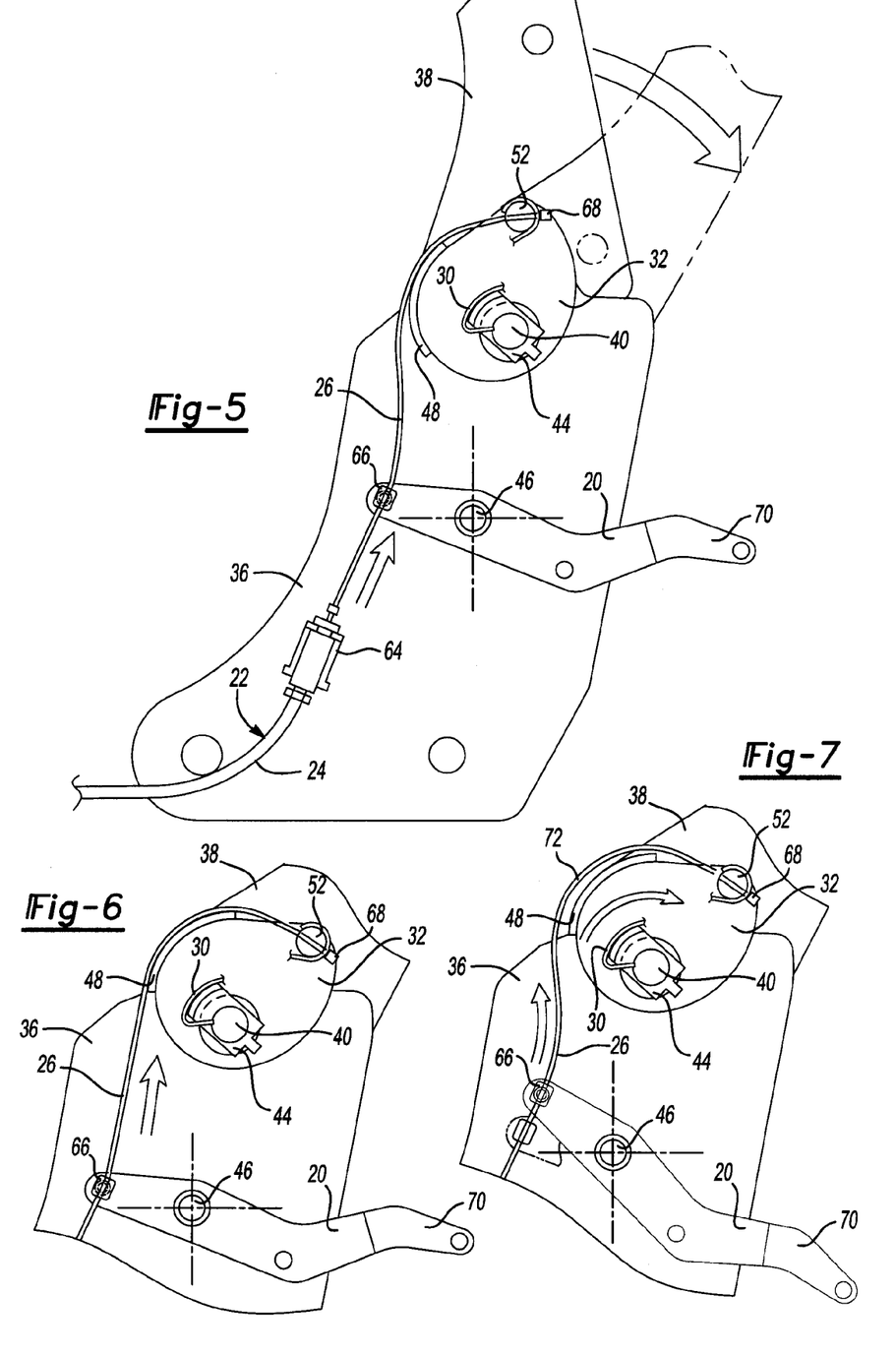
FIG. 5 is a fragmentary side elevation view showing the seat back being rotated back to its latched position with the cable being entrained around the cable guide cam to exert a force on the cable to reset the trigger.
FIG. 6 is a fragmentary side elevation view of the cable guide cam exerting a force on the latch to reset the latch and the trigger.
FIG. 7 is a fragmentary side elevation view showing the latch being reset to create slack in the cable after the trigger has been reset.

Referring to FIG. 5, the support bracket 38 is shown in solid lines just prior to being placed in its fully latched position that is shown in phantom lines. The support bracket 38 is rotated about the pivot pin 40 along with the cable guide cam 32. The support bracket 38 is driven against the force of the power spring 30 and rotates the cable/spring anchor 68 on the cable guide cam 32 that pulls the wire 26 of the cable 22 in the direction of the arrow adjacent to the wire 26. As the support bracket 38 is returned to its latched position tension is applied to the wire 26 by the cable guide cam 32. The tension applied by movement of the seat back 12 is transmitted by the wire 26 to reset a spring release mechanism (not shown) in the actuator 18.

Referring to FIG. 6, the latch lever 20 is shown at a point at which tension applied by the wire 26 resets the actuator 18 with the wire 26 being shown wound tightly around the cam flange 48. At this point, the lever 20 is in a position corresponding to the latching follower 56 being near the point at which the arcuate cam surface 60 meets the step 58. The seat back 12 is in its nearly fully upright position and the latch lever 20 is in its raised or unlatched position.

Referring to FIG. 7, movement of the seat back support bracket 38 has continued slightly past the point shown in FIG. 6 with the latch lever 20 moving from the arcuate cam surface 60 of the seat back support plate 38 to the step 58 that allows the latch lever 20 return to its starting position wherein it has pivoted slightly in a clockwise direction from the position shown in FIG. 6. As the latch lever 20 rotates in this final increment the latch lever creates a small amount of slack 72 in the wire 26. This slack portion 72 is important to facilitate manual actuation of the lever 20 by grasping the handle 70 without encountering resistance from the power spring 30.

Referring to FIGS. 8-11, an alternative embodiment 90 is shown in conjunction with a seat back 92 and seat base 94. In this embodiment, the actuator 98, or trigger, is reset after being unlatched by the continued movement of the seat back 92 to its overlying position relative to the seat base 94.

Figure 8:
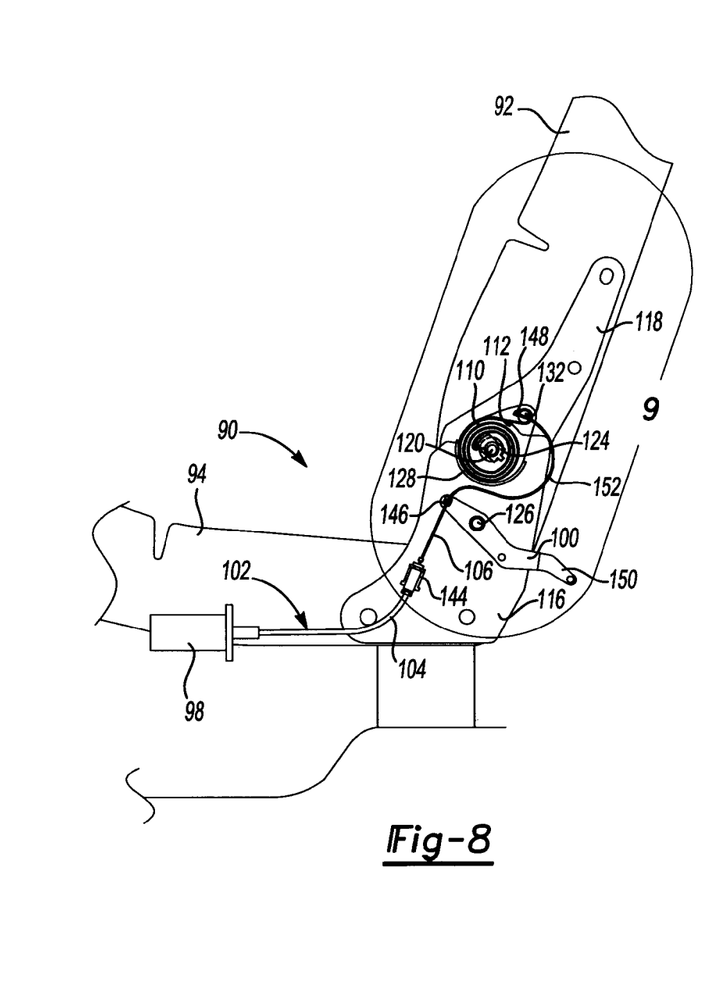
FIG. 8 is a fragmentary side elevation view of an alternative embodiment of the present invention in which the trigger is reset by the folding movement of the seat back relative to the seat base.

As shown in FIG. 8, the seat back 92 is in its upright position and fixed relative to the seat base 94. An actuator 98 similar to the actuator previously described with reference to FIGS. 1 through 7 is connected to a latch lever 100 by a Bowden cable 102, or link, that includes a sleeve 104 that partially encloses a wire 106 that is moveable relative to the sleeve 104. The wire 106 is connected to a power spring 110. A cable guide cam 112 is provided adjacent to the power spring 110 and is moved with the power spring 110. The actuator 98 and latch system is shown in its latched or ready position.

One or more seat base plates 116 is connected to a seat back support bracket 118 by a pivot pin 120. The spring bracket 124 secures the power spring 110 and cable guide cam 112 to the pivot pin 120. The latch lever 100 is supported on a lever pivot pin 126.

The cable guide cam 112 includes a cam flange 128 that also includes a groove (not shown) that guides the cable wire 26 as previously described with reference to groove 50 of the embodiment of FIGS. 1-7. The cable guide cam 112 is secured to the seat back support bracket 118 by a pin 32 as previously described with reference to the embodiment of FIGS. 1 through 7 and pin 52.

The latching mechanism is not shown for the embodiment of FIGS. 8-11 but may be substantially similar to that described with reference to FIG. 2 above.

Figure 9:
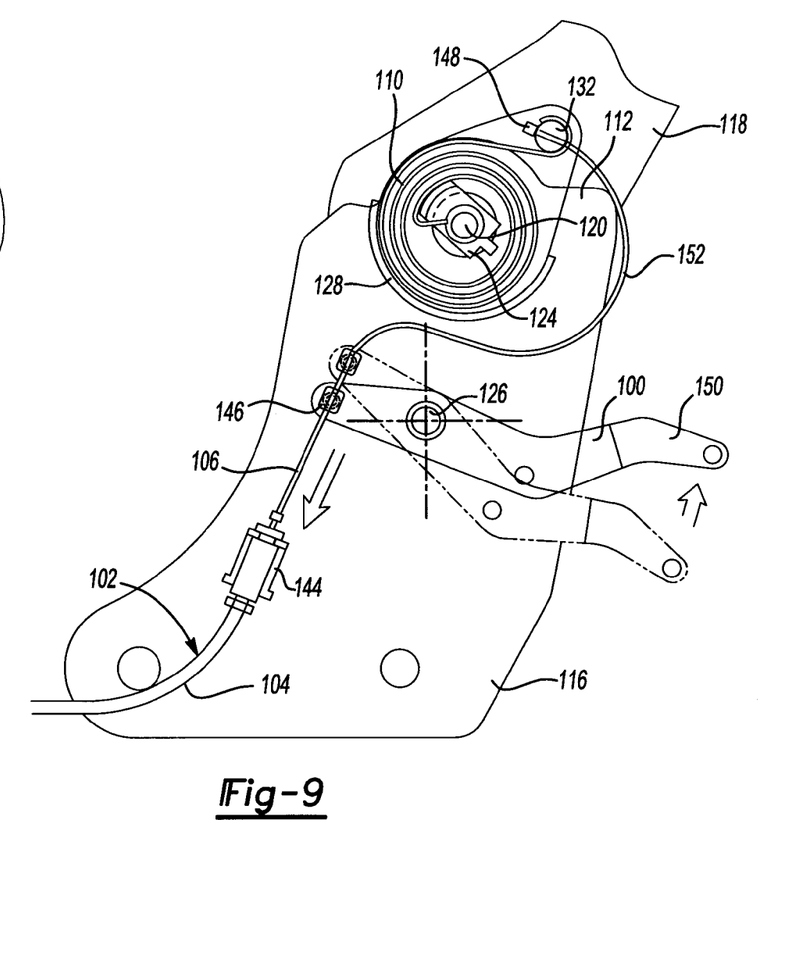
FIG. 9 is an enlarged fragmentary view of a portion of FIG. 8 showing the latch, power spring, and cable moving in response to actuation of the trigger.

Referring to FIG. 9, the latch lever 100 may be manually actuated by engaging the handle and pulling the handle in the direction shown by the direction arrow on the right side of FIG. 9. Alternatively, the latch lever 100 may be power actuated by actuating the trigger 98 to exert a pulling force indicated by the directional arrow shown adjacent to the wire 106 in the center of FIG. 9. When the trigger 98 is actuated the wire 106 is pulled through the sleeve 104 of the Bowden cable 102 that causes the latch lever 100 to pull the wire 106 and move the lever 100 from the position shown in phantom lines in FIG. 9 to the position shown in solid lines in FIG. 9. This movement causes the latching follower to clear the step 58 releasing the latch and allows the power spring 110 to drive the seat back 12 into its folded over position.

Figure 10:
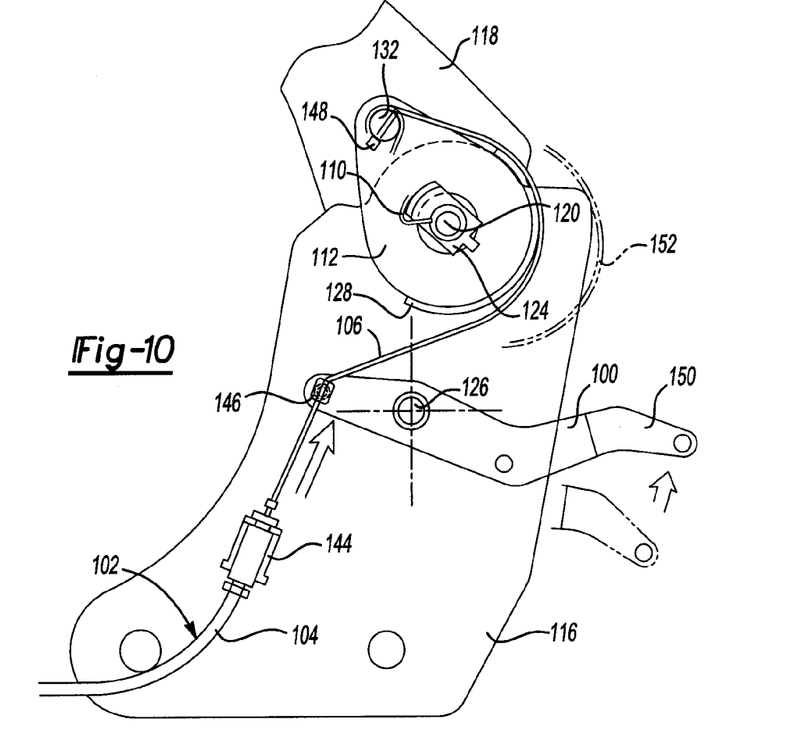
FIG. 10 is a fragmentary side elevation view of the alternative embodiment showing the seat back folding forward and causing the cable to be moved to reset the latch and trigger.

Referring to FIG. 10, the seat back support bracket 118 is shown rotated partially to its folded over position. The sleeve 104 is restrained by the cable sleeve bracket 144 and the wire 106 is pulled by the folding motion of the seat back support bracket 118. The lever/cable anchor 146 secures the lever 100 to the wire 106 while the cable/spring anchor 148 secures the end of the wire 106 to the cable guide cam 112. The handle 150 is shown in FIG. 10 in its released position in solid lines and is shown in its latched position in phantom lines. A slack portion 152 of the wire 106 is shown in phantom lines in FIG. 10 representing slack condition of the cable wire 106 when seat is in its latched or upright position. As the seat back support bracket 118 is folded forward, the slack portion 152 of the cable wire 106 is taken up and the further movement of the seat back support 118 applies tension to the wire 106 that resets trigger 98. The wire 106 moves away from the cable sleeve bracket 144 as shown by the directional arrow adjacent to the wire 106 and below the latch lever 100.

Figure 11:
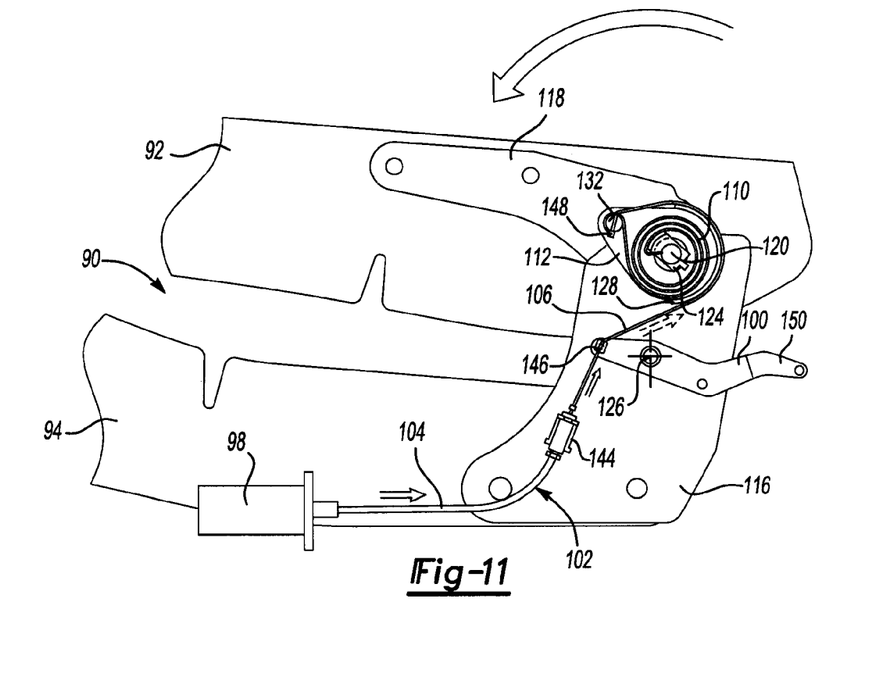
FIG. 11 is a fragmentary side elevation view of the alternative embodiment showing the seat back fully folded over the seat base with the cable exerting a force on the actuator to reset the actuator.

Referring to FIG. 11, the seat back 92 is shown folded over the seat back 94. The wire 106 as illustrated is wrapped around the cam flange 128 of the cable guide cam 112. The wire 106 has pulled the trigger in a direction illustrated by the arrows adjacent to the Bowden cable 102, or link. In the embodiment of FIGS. 8-11 the latch lever 100 remains in its raised position after the seat back 92 is folded over the seat base 94 and remains in this position until the seat back is returned to the position shown in FIG. 9 with the seat back 92 in its rearwardly inclined substantially vertical position. The latch lever 100 returns to the lower or ready position shown in FIG. 9 when latching follower 58 moves past the arcuate cam surface 60 and is again received against the step 58 as described with reference to FIG. 2 above.

In the illustrated embodiments, the seat backs 12 and 92 are disclosed as examples. The seat back may be more generically referred to as a latched member. Other types of latched members may include a seat base, a combination of a seat base and seat back, a headrest, a flat screen video display, a compartment cover, a glove box door, a hood, a deck lid, a seat back tilt adjustment armature, and the like. Another example in which more than one latched member is controlled by the latch and trigger is that of a seat back that folds over a seat base, and then the folded over seat is tumbled forward for storage, ingress, and egress. With any of those arrangements the trigger is electrically actuated and a movement of the latched member is executed to reset the trigger.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An actuator and a latch assembly comprising:
   a latch for securing a latched member, the latch having at least a release position and a locked position in which the latched member is retained by the latch;
   a link secured to the latch, the latch being moved by the link in a first direction from the locked position to the release position wherein the link is a cable;
   a trigger secured to the link, the trigger having a locked state and a released state, wherein the trigger is in the locked state when the latch is in the locked position, and further wherein the trigger is actuated in response to an electrical signal to release the latch as the trigger is switched to the released state; and
   wherein the trigger is mechanically reset to the locked state by the latched member; and
   a rotary cam guide about which the cable is entrained, the rotary cam guide controlling the tension applied by the cable to the latch, wherein a reset tension is required to reset the trigger and wherein tension in the cable is less than the reset tension when the latch is in the locked position.

2. The actuator of claim 1 wherein the trigger has a shape memory alloy actuating element that is selectively actuated by the electrical signal that causes heating through a phase change transition temperature.

3. The actuator of claim 1 wherein the latched member is a seat component or seat assembly.

4. The actuator of claim 1 wherein the latch is pivoted about a pivot point, wherein the latch has a manually engaged handle, and wherein the link is connected to the handle.

5. The actuator of claim 1 wherein the link is further secured to an anchor on the latched member through which the link acts upon the latched member and the latch is secured to the link between the trigger and the anchor.

6. The actuator of claim 5 wherein the trigger and the latch are reset by moving the latched member against the biasing force of a power spring that acts upon the latched member and exerts a force in a second direction on the link until the trigger and latch are reset to the locked state.

7. The actuator of claim 5 wherein the trigger and the latch are reset by moving the latched member that exerts a force in a second direction on the link until the trigger and the latch are reset to the locked state.

8. The actuator of claim 7 wherein the link is moved past the point at which the trigger and the latch are reset to the locked state, wherein tension in the link is reduced after the trigger and the latch are reset, and the latched member moves to the locked position.

9. The actuator of claim 1 wherein the trigger has a housing and a shiftable element that is attached to the link, wherein the shiftable element retracts the link in the first direction when the trigger is switched from the locked state to the released state.

10. The actuator of claim 1 further comprising a manually engaged handle on the latch that is connected to the link, wherein the link is not under tension when the latch is in the locked position to permit the latch to be manually moved to the released position.

11. The actuator of claim 1 wherein the trigger has a linearly movable armature that is held in the locked position by a locking member, wherein the locking member restrains an armature spring that applies a retraction force to the link in the first direction when the trigger is released.

12. A method of operating a latch that secures a latched member in a locked position, the latched member being selectively movable to a released position, the method comprising:
   actuating a trigger that is released in response to an electrical signal, wherein releasing the trigger results in a force being applied in a first direction to a cable that connects the trigger to the latch to release the latch, and wherein releasing the latch allows the latched member to move to the released position; and
   resetting the trigger by exerting a mechanical force on the trigger in a second direction that is opposite the first direction;
   wherein the latch has an alternative manual actuation mode and wherein the method further comprises alternatively actuating the latch by manually moving the latch which results in the force being applied in a first direction to release the latch and allows the latched member to move to the released position, and wherein during the resetting step a slack portion is created in the cable to facilitate manual actuation.

13. The method of claim 12 wherein the step of resetting the trigger is performed by moving the latched member to the locked position.

14. The method of claim 12 wherein the step of resetting the trigger is performed after the latch is released as the latched member moves to the released position.

* * * * *